(12) United States Patent
Olsen (10) Patent No.: US 9,894,124 B2
(45) Date of Patent: Feb. 13, 2018

(54) RAPID STARTUP WITH DYNAMIC RESERVATION CAPABILITIES FOR NETWORK COMMUNICATION SYSTEMS

(71) Applicant: Harman International Industries, Incorporated, Stamford, CT (US)

(72) Inventor: David Olsen, Kaysville, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 1202 days.

(21) Appl. No.: 13/943,089

(22) Filed: Jul. 16, 2013

(65) Prior Publication Data

US 2015/0026303 A1 Jan. 22, 2015

(51) Int. Cl.
*G06F 15/16* (2006.01)
*H04L 29/06* (2006.01)
*H04L 12/913* (2013.01)

(52) U.S. Cl.
CPC ............ *H04L 65/60* (2013.01); *H04L 47/724* (2013.01); *H04L 65/1069* (2013.01); *H04L 65/80* (2013.01)

(58) Field of Classification Search
CPC .......... H04L 29/00; H04L 65/00; H04L 47/00
USPC .................................................. 709/223, 219
See application file for complete search history.

(56) References Cited

U.S. PATENT DOCUMENTS

| | | |
|---|---|---|
| 7,324,491 B1 | 1/2008 | Benveniste |
| 2003/0161348 A1* | 8/2003 | Mills ........................ H04L 12/12 370/509 |
| 2005/0076339 A1* | 4/2005 | Merril .................. H04L 12/5695 718/104 |
| 2005/0117580 A1* | 6/2005 | del Val ................. H04L 12/5695 370/395.2 |
| 2005/0237952 A1* | 10/2005 | Punj ..................... H04L 12/1813 370/260 |
| 2006/0268678 A1 | 11/2006 | Dhesikan et al. |
| 2008/0235699 A1 | 9/2008 | Jeong et al. |
| 2012/0057461 A1* | 3/2012 | Bader ................... H04L 47/827 370/235 |
| 2012/0314597 A1* | 12/2012 | Singh .................. H04L 43/0882 370/252 |
| 2014/0173096 A1* | 6/2014 | Rao ...................... H04L 12/2602 709/224 |

FOREIGN PATENT DOCUMENTS

EP 2608455 A2 6/2013

OTHER PUBLICATIONS

G. Juve and E. Deelman, "Resource Provisioning Options for Large-Scale Scientific Workflows," 2008 IEEE Fourth International Conference on eScience, Indianapolis, IN, 2008, pp. 608-613.*

(Continued)

*Primary Examiner* — Christopher Biagini
*Assistant Examiner* — Messeret f Gebre
(74) *Attorney, Agent, or Firm* — McCoy Russell LLP (57) ABSTRACT

A network communication system may include talkers, listeners, and bridges configured to begin communication of a data stream without first establishing a reservation for the communication. Thereafter, a reservation protocol may be used to confirm the communication, and tear down the communication if the communication is not confirmed or when the communication is complete.

21 Claims, 3 Drawing Sheets

(56) References Cited

OTHER PUBLICATIONS

B. B Mukherjee, "WDM optical communication networks: progress and challenges," in IEEE Journal on Selected Areas in Communications, vol. 18, No. 10, pp. 1810-1824, Oct. 2000.*
S. Chen, B. Shen, S. Wee and X. Zhang, "SProxy: A Caching Infrastructure to Support Internet Streaming," in IEEE Transactions on Multimedia, vol. 9, No. 5, pp. 1062-1072, Aug. 2007.*
S. Ardon, et al., "Resources Reservation in a Reactive QoS Scheme", Global Telecommunications Conference '99, Dec. 1999, 8 pages.
European Patent Office, Extended European Search Report of EP14177254.1, dated Feb. 6, 2015, Germany, 12 pages.

* cited by examiner

RAPID STARTUP WITH DYNAMIC RESERVATION CAPABILITIES FOR NETWORK COMMUNICATION SYSTEMS

BACKGROUND

1. Technical Field

This description relates to an Ethernet Audio-Video Bridging ("AVB") network, and more particularly to managing data stream communications and reservations for the data stream communications with and without use of a stream reservation protocol.

2. Background Art

Data streams including audio and/or video data may be communicated in a network communication system from one endpoint to another endpoint. Before the data stream is communicated, messages may be communicated to reserve network paths between the endpoints. The network paths may include bridges, which may guarantee and enforce quality of service that is established during reservation of the network paths. Unknown delays may be experienced when creating the reservations.

SUMMARY

A network communication system may include a plurality of electronic devices configured to communicate a data stream over a network. The electronic devices may include a talker that transmits the data stream, at least one listener that receives the data stream, and at least one bridge in the network that receives the data stream and forwards the data stream to a next location over the network. The network communication system may include other talkers, listeners and/or bridges that are not involved in communicating the data stream or that communicate other data streams.

The electronic devices that communicate the data stream may begin doing so as soon as possible and before they otherwise would if the devices first established a reservation for the data stream communication. Upon startup, the devices may attain a link status, which enables the devices to communicate with peer nodes or devices in the system. After link status is attained, the devices may be initialized with a reservation protocol. For Audio-Video Bridging networks, the reservation protocol may be Stream Reservation Protocol (SRP). The initialization process may include a domain negotiation in which domain packets may be communicated with peer nodes. After the initialization process is performed, the devices may establish a reservation for the data stream communication. The reservation may be a reservation for a network path through the network and/or for network resources such as bandwidth, which may be guaranteed during communication of the data stream. Where a reservation protocol is used, messages may be communicated between the talkers and the listeners through the bridges in accordance with the reservation protocol to establish the reservation. Once the reservation is established, the data stream may be communicated over the network.

However, instead of waiting until a reservation is established before communicating the data stream, the electronic devices may communicate the data stream without establishing a reservation. To do so, the electronic devices may perform pre-reservation actions, which may include determining and/or accessing pre-reservation information. The pre-reservation information may be different, depending on whether the device is a talker, a listener, or bridge. For the talker, the pre-reservation information may include a stream identifier (ID), bandwidth allocation, and at least one destination address for at least one listener. For the at least one listener, the pre-reservation information may include the destination address and the stream ID. For the at least one bridge, the pre-reservation information may include mapping information and traffic shaping information.

When the electronic devices attain link status and complete performance of the pre-reservation actions, the electronic devices may be in a ready state to communicate the data stream. In the ready state, the electronic devices may begin communicating the data stream without first having a reservation established for the communication. The electronic devices may begin performing the pre-reservation actions at a time upon startup such that the pre-reservation actions are completed before link status is attained or as close as possible to link status being attained so that the devices are in the ready state to communicate the data stream as soon as possible following startup.

After the devices begin communicating the data stream, the devices may confirm the data stream communication using the reservation protocol with which they were initialized. To confirm the communication, the devices may communicate reservation messages in accordance with the reservation protocol. Through confirmation of the communication, a reservation for the communication may be established, which was not initially done before beginning communication of the data stream. Alternatively, if the devices determine that the data stream communication may not be confirmed, then the communication may be torn down, which also may be performed in accordance with the reservation protocol. Confirmation of the communication may be performed in response to detection of an expiration of a time period, which may be initially started upon initialization of the reservation protocol, and which may be reset and restarted after each subsequent expiration of the time period. Assuming that confirmation of the data stream communication is maintained throughout the duration of the communication, then when the communication is complete, the devices may terminate the communication and remove any reservations that may have been created when confirming the communication, which may be performed using the reservation protocol.

Various unknown delays may occur when establishing a reservation for a data stream communication, including delays during boot up of an operating system and/or propagation delays experienced as reservation messages traverse the bridges between the talkers and listeners. By foregoing establishment of a reservation before beginning to communicate a data stream, many if not all of these unknown delays may be eliminated, which may result in the data stream being communicated sooner upon startup of the system. At the same time, by using the reservation protocol to confirm and terminate the data stream communication, the electronic devices may be connected in the network in a plug-and-play manner that optimally and/or efficiently utilizes network resources, as provided for by the reservation protocol.

Other systems, method, features and advantages will be, or will become, apparent to one with skill in the art upon examination of the following figures and detailed description. It is intended that all such additional systems, method, features and advantages be included within this description, be within the scope of the description, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles described in the description. Moreover, in the figures, like referenced numerals designate corresponding parts throughout the different views.

DETAILED DESCRIPTION OF EMBODIMENTS

The present disclosure describes network devices that communicate data streams over a network without first establishing reservations for the data stream communications. After the network devices begin communicating the data streams, the network devices may affirm or tear down the communications using a reservation protocol. In this way, data streams may be communicated over the network upon startup without experiencing delays that may be incurred when reservations are established using a reservation protocol before communicating the data streams. At the same time, by affirming or tearing down the communications using a reservation protocol, the network communication systems may provide dynamic plug-and-play environments.

Figure 1:
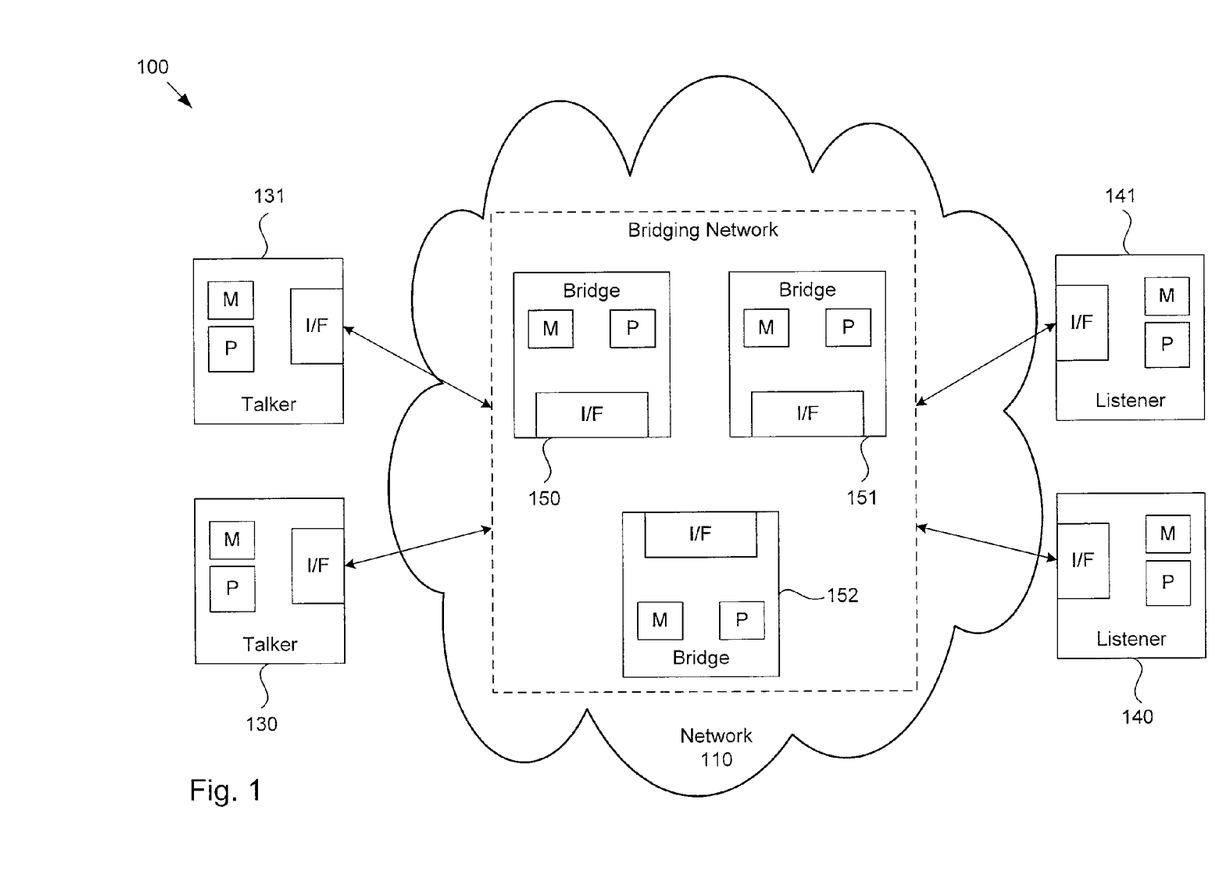
FIG. 1 is a block diagram of an example network communication system.

FIG. 1 shows a block diagram of an example network communication system 100. The network communication system 100 may include a plurality of electronic devices 130, 131, 140, 141 configured as end nodes and/or source and destination devices or nodes that communicate streams of data, including audio and/or video data, over a network 110. FIG. 1 shows four electronic devices, 130, 131, 140, 141 configured as end nodes, although more or fewer end nodes may be included in the network communication system 100.

Each of the electronic devices 130, 131, 140, 141, may be configured to perform one or more roles. The roles may include the role of a talker, the role of a listener, or some combination of the roles, such as a talker/listener. The role of the talker may be to transmit data across or over the network 110. In addition or alternatively, the role of the talker may be to establish, create, and/or reserve a network connection or path over the network 110 for the transmission of a data stream carrying the data. In addition or alternatively, the role of the talker may be to terminate the reservation and/or remove or tear down the network path or connection. The role of the listener may be to receive the data that is sent over the network 110. In addition or alternatively, the role of the listener may be to connect to and/or reserve connection to the network path for receipt of the data stream. In addition or alternatively, the role of the listener may be to remove connection from the network path and/or terminate receipt of the data stream.

The electronic devices 130, 131, 140, 141 may be configured to switch between or change roles. Alternatively, the roles that the electronic devices 130, 131, 140, 141 may be configured to perform may be fixed. For the following description, the electronic devices 130, 131 are configured as talkers, and the electronic devices 140, 141 are configured as listeners.

The network communication system 100 may also include one or more electronic devices or network nodes configured as bridges and/or making up a bridging system or network in the network 110. FIG. 1 shows three bridges 150, 151, and 152, although other numbers of bridges may be included.

The bridges 150, 151, 152 may communicate data streams and/or other information or messages between the talkers 130, 131, the listeners 140, 141, and between each other. The bridges 150, 151, 152 may receive data streams and forward the received data streams to next locations along network paths. In addition, the bridges 150, 151, 152 may be used to create and tear down the network paths by receiving and forwarding information or messages over the network 110 between the talkers 130, 131 and the listeners 140, 141. The bridges 150, 151, 152 may also be configured to guarantee and enforce quality of service for establishment of the network paths and transmission of the data streams. For example, the bridges 150, 151, 152 may prevent establishment of network paths that are unable to handle a specified bandwidth. In addition, the bridges 150, 151, 152 may enforce priority schemes or hierarchies for the data streams, such as by preventing lower priority data streams from disrupting communication of higher priority data streams during a session. Other guarantees or enforcements of quality of service may be possible.

The network 110 may be configured in accordance with Layer 2 of the Open Systems Interconnection (OSI) model, in which routing and forwarding decisions or determinations in the network 110 may be performed on a media access control (MAC) addressing basis. An example Layer 2 network may be an Ethernet Audio/Video Bridging (AVB) network. For Layer 2 networks configured as AVB networks, the talkers 130, 131 and the listeners 140, 141 may be configured to communicate over the AVB network 110 using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may also or alternatively be used.

The electronic devices or network nodes in the system 100, including the talkers 130, 131, the listeners 140, 141, and the bridges 150, 151, 152, may be configured to attain link status to communicate with each other. When the electronic devices in the system 100 attain link status, the electronic devices are able to identify their peer devices or nodes and are able to verify that they may communicate with their peer nodes. A peer device or peer node may be an electronic device or network node in the system 100 with which another electronic device or network node directly communicates. Here, direct communication may refer to communication between two electronic devices or network nodes in the system 100—e.g., between a bridge and a talker, between a bridge and a listener, or between two bridges—without receipt or interception by another network node or electronic device in the system 100 prior to receipt by the receiving device or node. To illustrate, the first bridge 150 may directly communicate a data stream to the second bridge 151 in that the first bridge 150 may transmit the data stream to the second bridge 151 without receipt by another network node (e.g., the third bridge 152, the talkers 130, 131, and/or the listeners 140, 141) before the second bridge 151 receives the data stream. Once the electronic devices attain link status, the electronic devices may be able to communicate with their peer nodes.

The electronic devices in the system 100 may be configured to attain link status at a time subsequent an initial time when the system 100 and/or the devices in the system 100 perform an initial startup or boot up process. The initial startup may occur when the system 100 and/or the electronic devices in the system 100 transition from a powered down state to a powered up state upon receiving power. Between the initial time that the system 100 initially starts up and the subsequent time that the system 100 attains link status, the electronic devices may communicate information with their peer nodes to attain link status. In particular, the electronic devices may communicate auto-negotiation messages with their peer nodes to confirm that they are communicating with their peer nodes at the same speed and/or with the same duplex communication configuration and/or parameters. Once the electronic devices communicate the auto-negotiation messages and confirm the speed and duplex communication configuration, link status may be attained.

After the electronic devices attain link status, the electronic devices may communicate data streams over the network 110 between the talkers 130, 131 and the listeners 140, 141, provided that the electronic devices perform certain additional actions to initiate the data stream communications. For some example configurations, some or all of the electronic devices in the system 100 may be configured to reserve a network path through the network 110 and/or network resources such as bandwidth to communicate a data stream over the network 110. In addition or alternatively, some or all of the electronic devices may be configured to communicate a data stream without establishing a reservation. Instead of making a reservation, the electronic devices may perform pre-reservation actions to communicate the data stream, as described in further detail below.

Where a reservation is made to transmit a data stream, the reservation may be made using a reservation protocol. For AVB networks, the reservation protocol may be SRP. In order for a reservation to be made using SRP, the electronic devices or network nodes in the system 100, including the talkers 130, 131, the listeners 140, 141, and the bridges 150, 151, 152 may perform SRP initialization and domain negotiation. When performing SRP initialization and domain negotiation, the electronic devices may transmit and receive domain packets with peer devices or nodes in the system 100. After the electronic devices in the system 100 transmit domain packets to their peer nodes and receive domain packets from their peer nodes, the electronic devices or nodes may know the virtual local area network (VLAN) over which to communicate and may also know SRP priorities.

In addition, during SRP initialization, the bridges 150, 151, 152 may be configured to determine mapping information and traffic shaping information. The mapping information may identify where through the bridge the data stream is to go upon receipt. For example, the mapping information may associate ingress ports, egress ports, and destination addresses. From the mapping information, the bridge may determine the egress port on which to send a data packet received on an ingress port and having a particular destination address. Additionally, the bridges 150, 151, 152 may be configured to determine traffic shaping information. The traffic shaping information may determine an amount of data in the data stream and an appropriate rate at which the data stream is to be output by the bridges. The traffic shaping information may be used by the bridges to reduce network jitter from the data stream and/or to prevent the data stream from consuming excess network bandwidth and/or from flooding the network. Various types or schemes of traffic shaping information may be used. AVB networks may use credit-based traffic shaping, although other types or schemes of traffic shaping, such as first-in first-out (FIFO) or priority queuing, may be used.

After the bridges 150, 151, 152 determine the mapping information and the traffic shaping information during SRP initialization, the bridges 150, 151, 152 may be configured to receive a data stream and forward the data stream to a next hop or location in the system 100 in accordance with the mapping information and the traffic shaping information. Conversely, without determining the mapping information and the traffic information, upon receipt of the data stream, the bridges 150, 151, 152 may identify the received data stream as unknown and in turn, may drop the data in the data stream, or alternatively may flood the network 110 with the data stream by sending out the data stream on all ports. In addition or alternatively, the bridges 150, 151, 152 may be configured to use default forwarding and/or traffic shaping techniques. In some example configurations, the default forwarding technique may be to broadcast or multicast the received data stream on all ports (i.e., flood the network 110). In addition or alternatively, the default traffic shaping technique may be a first-in first-out traffic shaping technique.

SRP initialization and domain negotiation may be triggered or performed after startup of the system 100 and/or the devices in the system 100, which may be controlled by one or more operating systems of the system 100 or of the devices in the system 100. Additionally, as previously described, SRP initialization and domain negotiation may be performed after the electronic devices attain link status. Hereafter, SRP initialization and domain negotiation, including any actions performed or messages communicated during SRP initialization and domain negotiation, is referred to in short as "SRP initialization" for simplicity.

After the electronic devices or nodes in the system perform SRP initialization, the electronic devices may communicate SRP messages in accordance with SRP to reserve network paths and network resources for communication of a data stream over the network 110. In particular, when the talkers 130, 131 determine to transmit a data stream, the talkers 130, 131 may advertise the data stream transmission to other devices in the system 100 by generating and sending an advertisement message, referred to as a talker advertise (TA) message, over the network 110. To generate a TA message, the talkers 130, 131 may be configured to determine one or more talker attributes to include in the TA message. The talker attributes may identify characteristics about the talkers 130, 131 and/or the data stream being advertised to reserve and establish the network path. For example, the talker attributes may identify that the talkers 130, 131 want to transmit the data stream to one or more of the listeners 140, 141. The talker attributes may also identify a type of the transmission, such as whether the transmission is a unicast, a multicast or a broadcast transmission, as examples. In addition or alternatively, the talker attributes may identify one or more destination addresses, such as Layer 2 or MAC destination addresses, to which to send the data stream. The destination addresses may be destination addresses of listeners in the network communication system 100, such as the listeners 140, 141. In addition or alternatively, the destination addresses may be multicast destination addresses.

In addition or alternatively, the talker attributes may identify a unique stream identifier ("ID") for the advertised data stream. By being unique, no two registered or reserved data streams may have or be assigned the same stream ID.

For some example implementations, the stream ID may be a unique sequence of characters and/or numbers which may be assigned to only one data stream.

In addition or alternatively, the talker attributes may identify one or more quality of service (QoS) parameters for and/or associated with transmission of the data stream. Quality of service may generally refer to an ability to provide or set different priorities to different transmission of data streams and/or to guarantee an identified level of performance for the transmissions. Various QoS parameters may be identified or have amounts that are determined or required for the different priorities and/or the levels of performance. Example QoS parameters may include bandwidth for transmission of the advertised data stream. Other QoS parameters may include propagation delay, bit rate, jitter, packet dropping probability, and/or bit error rate, as examples.

One or more of the listeners 140, 141 may receive a TA message transmitted over the network 110. If a listener receives the TA message, the listener may determine whether the listener wants to receive the data stream being advertised in the TA message. The listener may be configured to identify the destination address and/or the stream ID included in the TA message to determine whether the listener wants to receive the data stream. If the listener wants to receive the data stream, the listener may register and/or store the TA message and/or the talker attributes.

In addition, the listener may generate and send a ready message, referred to as a listener ready (LR) message over the network 110, which may indicate that the listener requests or wants to receive or attach to the data stream and/or that the listener is ready to receive the data stream. In some situations, the listener may send the LR message in response to receipt of the TA message. In other situations, the listener may send the LR message first without receipt of the Layer 2 advertisement message, such as where the talkers and listeners are configured for asynchronous communication.

The listener may determine one or more listener attributes to include in the LR message. The listener attributes may be used to request receipt of the data stream being advertised by the talker. An example listener attribute may include the stream ID included in the TA message, which may be used to match or compare the stream ID included in the TA message and/or to compare the talker attributes and the listener attributes for reservation of the network path and transmission of the data stream.

The talker that sent the TA message may receive the LR message from over the network 110. In response, the talker may register or store the LR message and/or the listener attributes included in the LR message. In addition, when the talker receives the LR message, the reservation for the network path and/or resources identified in the TA message may be complete. In some example configurations, where multiple listeners sent multiple LR messages, multiple network paths may be reserved and established between the talker and the multiple listeners for transmission of the data stream.

The bridges 150, 151, 152 may be configured to receive the TA and LR messages and communicate the TA and LR messages over the network 110 between the talkers 130, 131 and the listeners 140, 141 so that reservations may be made. In doing so, the bridges 150, 151, 152 may guarantee and enforce quality of service for communication of data streams in accordance with SRP. In particular, in response to receipt of a TA message, if a bridge does not have sufficient bandwidth or resources available as indicated or specified in the TA message, the bridge may change the TA message to a Talker Failed (TF) message and forward the TF message instead of the TA message over the network 110. The TF message may indicate an advertisement for an unavailable data stream. Additionally, if one or more listeners want to attach to a data stream, but there is insufficient bandwidth or resources for transmission to at least one of the listeners, Listener Ready Failed (LRF) messages or Listener Asking Failed (LAF) messages may be communicated instead of LR messages. A LRF message may indicate that at least one but less than all of the listeners are unable to receive the data stream. A LAF message may indicate that all of the listeners are unable to receive the data stream.

After the TA and LR messages and associated talker and listener attributes are registered and a reservation for one or more network paths is complete, the data stream may be transmitted over the established network path from the talker and to the one or more listeners that reserved connection for the data stream.

In addition or alternatively to making a reservation using SRP to transmit a data stream, at least some of the electronic devices in the system 100 may be configured to communicate one or more data streams over the network 110 without making a reservation using SRP. To do so, the electronic devices may be configured to perform one or more pre-reservation actions or functions and/or may be preconfigured with pre-reservation information so that the devices may communicate data streams over the network 110 without a SRP reservation. These pre-reservation actions and/or the pre-reservation information that the devices may determine and/or be preconfigured with may be different depending on whether the device is a talker, a listener, or a bridge.

To be configured to transmit a data stream over the network 110 without making or establishing a reservation using SRP, the talkers 130, 131 may be configured to determine pre-reservation information, which for the talkers 130, 131, may include attributes for the data stream, including a stream ID and bandwidth allocation. The pre-reservation information determined by the talkers 130, 131 may also include one or more destination addresses for listeners that may want to receive the data stream. Upon startup, the talkers 130, 131 may be configured to determine or access the stream attributes and the one or more destination addresses without performing SRP initialization or transmitting a TA message to establish a reservation. The information accessed by the talkers 130, 131 may be stored in memory, which may be a local memory of the talkers 130, 131, external memory that is external to the talkers 130, 131 in the system 100, a memory external to the system 100, or some combination thereof. In addition, upon startup, the talkers 130, 131 may be configured to perform other actions or functions to transmit the data stream. For example, the talkers 130, 131 may obtain or generate the data to be transmitted. As examples, the talkers 130, 131 may activate any data-gathering equipment or mechanisms, such as cameras or sensors, and begin obtaining the data. In addition or alternatively, the talkers 130, 131 may retrieve data stored in memory. In addition or alternatively, the talkers 130, 131 may obtain other information for transmission of the data stream, such as identifying a format of the data stream (e.g., video or audio), as an example. After the talkers 130, 131 obtain the data to be transmitted and determine the stream attributes, destination addresses, and any other information for transmission of the data stream, the talkers 130, 131 may be configured to transmit the data stream over the network 110.

To receive a data stream over the network 110 without making or establishing a reservation using SRP, the listeners 140, 141 may be configured to determine their destination addresses and the stream ID of the data stream. The listeners 140, 141 may be configured to access their destination addresses and the stream ID without performing SRP initialization or transmitting a LR message to establish a reservation. The destination addresses and the stream ID may be stored in memory, which may be a local memory of the listeners 140, 141, memory that is external to the talkers 140, 141 in the system 100, a memory external to the system 100, or some combination thereof. Upon startup, the listeners 140, 141 may be configured determine their destination addresses and the stream ID, such as by accessing the information from memory. When the destination addresses and the stream ID are determined and the listeners 140, 141, the ports of the listeners 140, 141 may be open for and the listeners 140, 141 may be receptive to receiving the data stream from over the network 110.

Because the talkers 130, 131 and the listeners 140, 141 may begin communicating the data stream without first establishing a reservation using SRP, the bridges 150, 151, 152 may receive the data stream without first receiving SRP messages (e.g., TA and LR messages) from the talkers 130, 131 and the listeners 140, 141. To ensure that the data stream is properly handled (i.e. that the data stream is forwarded to a next destination and the data stream traffic is properly shaped as it passes through the bridge), the bridges 150, 151, 152 may be configured to determine the mapping and shaping information independent of and/or without SRP initialization. The mapping information and the traffic shaping information accessed by the bridges 150, 151, 152 may be stored in memory, which may be a local memory of the bridges 150, 151, 152, memory that is external to the bridges 150, 151, 152 in the system 100, a memory external to the system 100, or some combination thereof. Upon startup, the bridges 150, 151, 152 may be configured to determine and/or access the mapping information and the traffic information independent of SRP initialization and/or without the determination being part of SRP initialization. After the bridges 150, 151, 152 determine the mapping information and the traffic shaping information, the bridges 150, 151, 152 may be configured to receive a data stream and forward the data stream to a next hop or location in the system 100 in accordance with and/or using the mapping and shaping information.

When the electronic devices complete the pre-reservation actions and also attain link status, the electronic devices may be configured in a ready state to communicate a data stream over the network. The electronic devices may be in the ready state and begin communicating the data stream without establishing a reservation for the data stream communication using SRP, and regardless of whether or not the electronic devices are configured to manage stream reservations using SRP, such as through SRP initialization. The electronic devices that perform the pre-reservation actions to transmit a data stream may do so during a time period following startup such that the data stream is being communicated over the network as soon as possible. To do so, the electronic devices may perform the pre-reservation actions at a time such that the devices are configured in the ready state as soon as possible. That is, the electronic devices may perform the pre-reservations actions at a time such that they are completed before link status is attained or at least as close to link status being attained as possible. The electronic devices may begin performing the pre-reservation actions in response to or immediately following the startup of the devices at the initial time. In addition or alternatively, the electronic devices may perform at least some of the pre-reservation actions concurrently with communication of the auto-negotiation messages with their peer nodes to attain link status. In addition or alternatively, the electronic devices may perform at least some of the pre-reservation actions before SRP initialization begins or completes. In general, the electronic devices may perform the pre-reservation actions at a time following startup such that the data stream may be communicated over the network 110 at the time link status is attained or at a time after link status but before the data stream would otherwise be communicated if a reservation for transmission of the data stream is first established using SRP.

The electronic devices in the system may be configured to control and/or manage the data stream communications after the communication begin. Management and control of the data stream communications may be performed in accordance with and/or using SRP. For example, the electronic devices may be configured to confirm or remove one or more reservations and/or keep alive or tear down one or more data stream communications. After SRP initialization is complete, the talkers 130, 131 and listeners 140, 141 that are communicating a data stream and/or that have established a reservation for communication of a data stream may be configured to confirm the communication and/or the reservation through transmission or communication of TA and LR messages over the network 110. The TA and LR messages may be communicated in response to receipt of a confirmation message, referred to as a Leave All (LA) message under SRP, over the network 110. When a LA message is received, the talkers 130, 131 and listeners 140, 141 may transmit TA and LR messages over the network 110 to confirm the data communications or reservations. If the TA and LR messages are successfully communicated over the network 110 and registered, then the communication and/or reservation may be confirmed or maintained, and any data stream being communicated may continue to be communicated. Further, if a reservation was not previously established for the data stream, then the reservation may be established through communication of the TA and LR messages to confirm the communication. Alternatively, if the TA and LR messages are unsuccessfully communicated (e.g., the TA and/or LR messages are not transmitted in response to a LA message, or the TA and/or LR messages are changed to talker and listener failed messages by one or more bridges 150, 151, 152), then the reservation may be removed, and any data streams being communicated may be torn down.

An LA message may be transmitted in response to expiration of a predetermined time period. The predetermined time period may be a default time period, such as ten seconds, that is set in accordance with SRP. Alternatively, the predetermined time period may be different than the default time period. For example, the time period may be changed from the default time period to a different time period, and/or set to a different time period when preconfiguring and/or initializing the system 100. In alternative configurations, a plurality of different time periods may be used, one of which may or may not be the default time period. Various configurations may be possible for determination of the time period.

The time period may be controlled and/or managed by a timer or timer system in the network communication system 100. In some example configurations, each electronic device or network node in the system 100, including the talkers 130, 131, the listeners 140, 141, and the bridges 150, 151, 152, may be configured to set its own timer. When an electronic device's timer detects expiration of a time period, the electronic device may be configured to send a LA message over the network 110 to the other electronic devices or network nodes in the system 100. When the other electronic devices receive the LA message, the other devices may reset their timers to an initial value without transmitting their own LA message over the network 110.

An initial time period for transmission of a LA message may be triggered or begin upon completion of SRP initialization. That is, once the electronic devices or network nodes in the system 100 are initialized in accordance with SRP, they may start their timers. When a timer for one of electronic devices detects expiration of the initial time period before the timers of the other electronic devices detect expiration, the electronic device that detected the expiration may transmit a LA message over the network 110, which may cause the other devices to reset their timers. Subsequent LA messages may then be transmitted over the network 110 after expiration of subsequent time periods, which may be detected by the same electronic device that detected expiration of the initial time period or other electronic device in the system 100.

In alternative example configurations, instead of each electronic device or network node in the system 100 controlling or managing its own timer, a single electronic device in the system 100 may be designated as the device or network node that controls or manages the timer and transmits LA messages for the system 100 upon expiration of a time period. In still other alternative example configurations, more than one but less than all of the electronic devices in the system 100 may be configured to control or manage a timer and communicate LA messages over the system 100. Various configurations are possible.

In addition to confirming data stream communications and/or reservations through LA messages, the electronic devices may also be configured to terminate the communications and/or reservations when the data stream communication ends. In particular, the electronic devices may be configured to communicate termination messages to terminate the communication. Under SRP, the talker may transmit Talker Advertisement Leave (TAL) messages, and the listeners may transmit Listener Ready Leave (LRL) messages to terminate the communication. In response to the termination messages, the reservations for the network paths may be terminated, the registrations of the TA and LR messages and associated talker and listener attributes may be de-registered, and any resources consumed for communication of the data stream may be made available for other communications of data streams.

In addition, reservations for new or subsequent data stream communications may be made using SRP following any initial communications upon startup of the system 100. For example, upon startup of the system, at least one data stream may be communicated over the network 110 in response to at least some of the electronic devices in the system 100 performing pre-configuration actions. Thereafter, one or more new talkers and/or one or more new listeners may enter the system 100 and/or connect to the network 110 and perform SRP initialization and make a reservation for communication of a data stream using SRP. In addition or alternatively, one or more existing talkers and/or listeners that initiated communication of a data stream by performing pre-reservation actions may establish a reservation for communication of another data stream using SRP.

By communicating data streams by performing the pre-reservation actions instead of establishing a reservation using SRP, these data streams may be communicated over the network 110 between the talkers and listeners as soon as possible following startup of the system 100. In addition, by using SRP to confirm the communications, terminate the communications, and create new reservations with SRP, the system 100 may have or provide a dynamic plug-and-play system or environment that ensures that network resources are efficiently utilized.

As shown in FIG. 1, each of the talkers 130, 131, the listeners 140, 141, and the bridges 150, 151, 152 may include and/or communicate with a processor P configured to perform the above described functions. The processor P may be a general processor, a digital signal processor, a controller, a microcontroller, an application specific integrated circuit, a field programmable gate array, an analog circuit, a digital circuit, combinations thereof, or other now known or later developed processors. The processor P may be a single device, a plurality of devices, or a combination of devices, such as associated with a network or distributed processing. Any of various processing strategies may be used, such as multi-processing, multi-tasking, parallel processing, remote processing, or the like. The processor P may be responsive to and/or configured to execute instructions stored as part of software, hardware, integrated circuits, firmware, micro-code, or the like.

In addition, the talkers 130, 131, the listeners 140, 141, 142, and the bridges 150, 151, 152 may include a memory M in communication with the processor P. The memory M may be one or more non-transitory and/or tangible computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, and the like. The memory M may be a single device or a combination of devices. The memory M may be adjacent to, part of, networked with and/or removed from the processor P. Logic encoded in one or more tangible media for execution is defined as the instructions that are executable by the programmed processor P and that are provided on the computer-readable storage media, memories, or a combination thereof.

The memory M may be a computer readable storage media having stored therein data representing instructions executable by the programmed processor P. The memory M may store instructions for the processor P. The processor P may be programmed with and execute the instructions. The functions, acts, methods, or tasks illustrated in the figures or described herein may be performed by the programmed processor P executing the instructions stored in the memory M. The functions, acts, methods or tasks may be independent of the particular type of instructions set, storage media, processor or processing strategy and may be performed by software, hardware, integrated circuits, firmware, micro-code, and the like, operating alone or in combination. The instructions may be for implementing the processes, techniques, methods, or acts described herein.

Additionally, the talkers 130, 131, the listeners 140, 141, 142, and the bridges 150, 151, 152 may include one or more interfaces (I/F) in communication with the processor P and the memory M, and that may be used to communicate information with each other over the network 110. For some example configurations of the communication system 100, the talkers 130, 131, the listeners 140, 141, 142, and the bridges 150, 151, 152 may be configured as network devices configured to communicate over a network, such as an Ethernet Audio-Video Bridging (AVB) network or other vehicle network, as examples. For these configurations, the interface I/F may be a network interface and/or implemented in hardware, such as a hard-wired or wireless network interface. Alternatively, one or more of the interfaces I/F may be non-network I/F and/or some or all of the systems may communicate with each other over non-network connections. In addition or alternatively, the interface I/F may be a universal asynchronous receiver/transmitter (UART), a parallel digital interface, a software interface, Ethernet, or any combination of known or later developed software and hardware interfaces. Various configurations are possible.

In addition to being a Layer 2 network, such as an AVB network, the network 110 may be configured in various types or forms. As examples, the Layer 2 networks 110, 112 may include wide area networks (WAN), such as the Internet, local area networks (LAN); campus area networks; metropolitan area networks; or any other wireless and/or wireline networks that may allow for data communication. In addition or alternatively, the network 110 may be divided into sub-networks, which may allow access or restrict access to some or all the components, including the electronic devices 130, 131, 140, 141, 150, 151, 152 connected to and/or included in the network 110. In addition or alternatively, the network 110 may be regarded as a public or private network and may include, for example, a virtual private network, an encryption, or any other security mechanism employed over the public Internet, or the like. Various other types or forms of networks for the network 110 may be possible.

Figure 2:
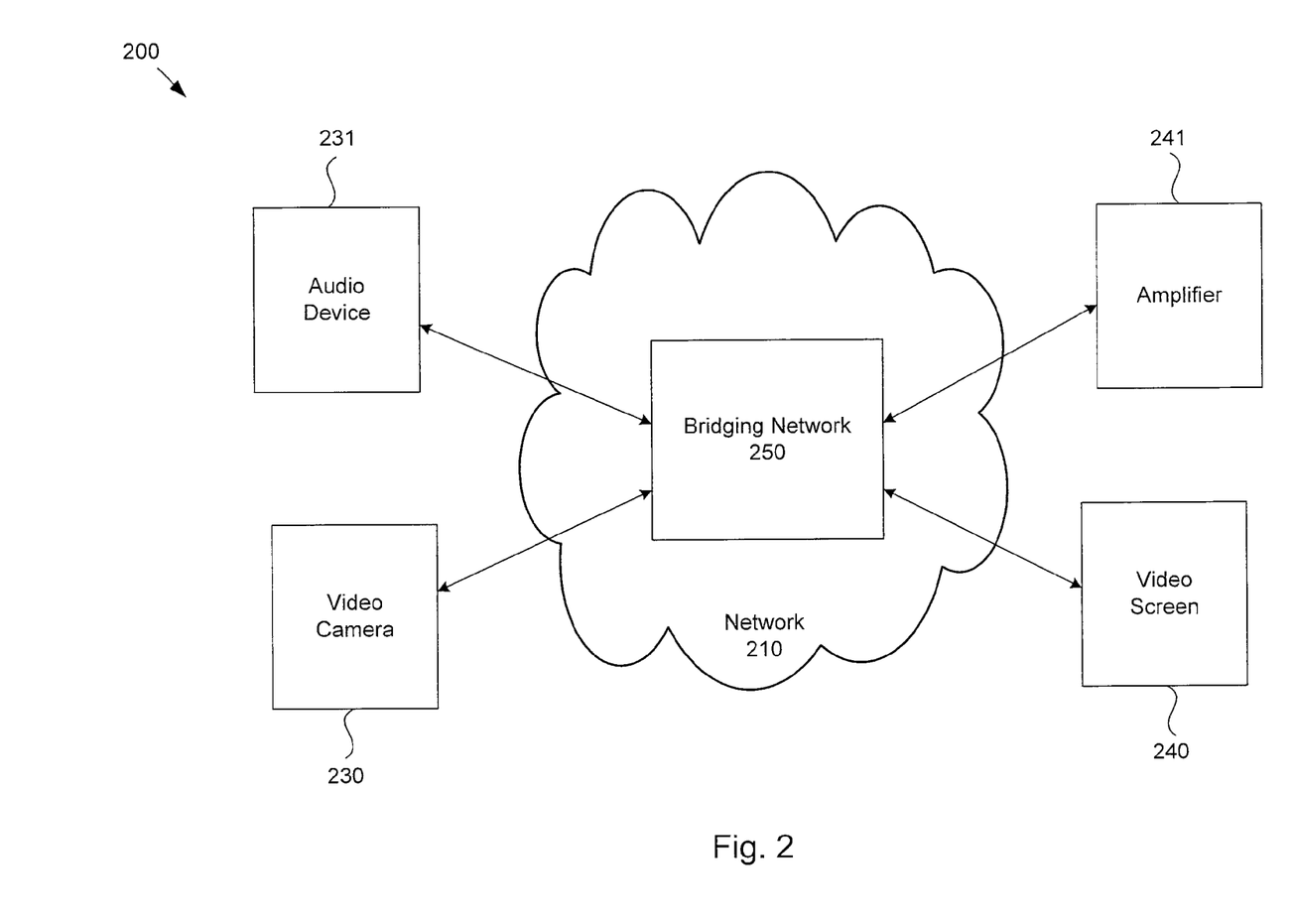
FIG. 2 is a block diagram of an example automotive communication system.

FIG. 2 shows an example automotive system 200 in which the example network communication system 100 shown in FIG. 1 may be implemented. The automotive system 200 may be included in a vehicle, automobile, or other transportation machine. The automotive system 200 may include a plurality of electronic devices that may be configured to communicate data over a network 210, which may be an AVB network. The automotive system 200 may include at least one electronic device for which communication of data over the network 210 as soon as possible upon startup of the vehicle may be desirable or critical. For some automotive applications, the desired or critical time period may be within 200 milliseconds upon startup. Additionally, the automotive system 200 may include one or more other electronic devices for which communication over the network 210 as soon as possible upon startup of the vehicle may not be desirable or critical.

An example talker in the system 200 may be a video camera 230 that captures images of a surrounding environment of the vehicle and sends the images as a video data stream through a bridging network 250 over the network 210 to a video screen 240 configured as a listener that receives the video signal and displays the video. Another example talker may be an audio device 231, such as a radio, a compact disc (CD) player or digital audio player, configured as a talker that outputs an audio data stream through the bridging network 250 over the network 210 to an amplifier or other audio output system 241 configured as a listener that outputs the audio.

Upon startup of the vehicle and the automotive system 200, it may be desirable or critical for the video camera 230 to capture video images of the surrounding environment of the vehicle and transmit the video images to the video screen 240 for display as soon as possible. As such, the video camera 230 as a talker and the video screen 240 as a listener may perform the talker and listener pre-reservation actions, respectively. Additionally, one or more bridges in the bridging network 250 to receive the data stream may perform the bridging pre-reservation actions. Upon startup of the vehicle, after the pre-reservation actions are performed and link status is attained, the video camera 230 may transmit captured video images through the bridging network 250 over the network 210 to the listener 240 without establishing a reservation for the transmission using SRP.

In addition, communication of an audio signal from the audio device 231 to the amplifier 241 as soon as possible upon startup of the vehicle may not be desirable or critical. As such, the audio device 231 may not communicate an audio data stream through the bridging network 250 over the network 210 to the amplifier 241 until the devices 231, 241, 250 are initialized with SRP and a reservation for communication of the audio signal is established through communication and/or registration of TA and LR messages. Because communication of the audio data stream does not occur until a reservation is made using SRP, communication of the audio data stream may begin after communication of the video data stream output by the video camera 231 begins even though all of the devices 230, 231, 240, 241 are part of the automotive system 200 upon startup of the vehicle.

Subsequent to either or both of the data stream communications between the video camera 230 and the video screen 231 and/or the audio device 231 and the amplifier 241, the electronic devices in the system may use SRP to communicate LA messages over the network 210 to confirm or validate the data stream communications. For example, upon receipt of a LA message, the video camera 230 may communicate a TA message and the video screen 240 may communicate a LR message, which may be subsequently registered to confirm or validate the communication of the video data stream. In addition or alternatively, the video camera 230 and the video screen 240 may transmit termination messages, such as TAL and LRL messages under SRP, to de-register any TA and LR messages registered in response to any LA messages and/or to terminate the video data stream communication. Similar SRP messages may be communicated to confirm and/or terminate the audio data stream communicated between the audio device 231 and the amplifier 241.

Figure 3:
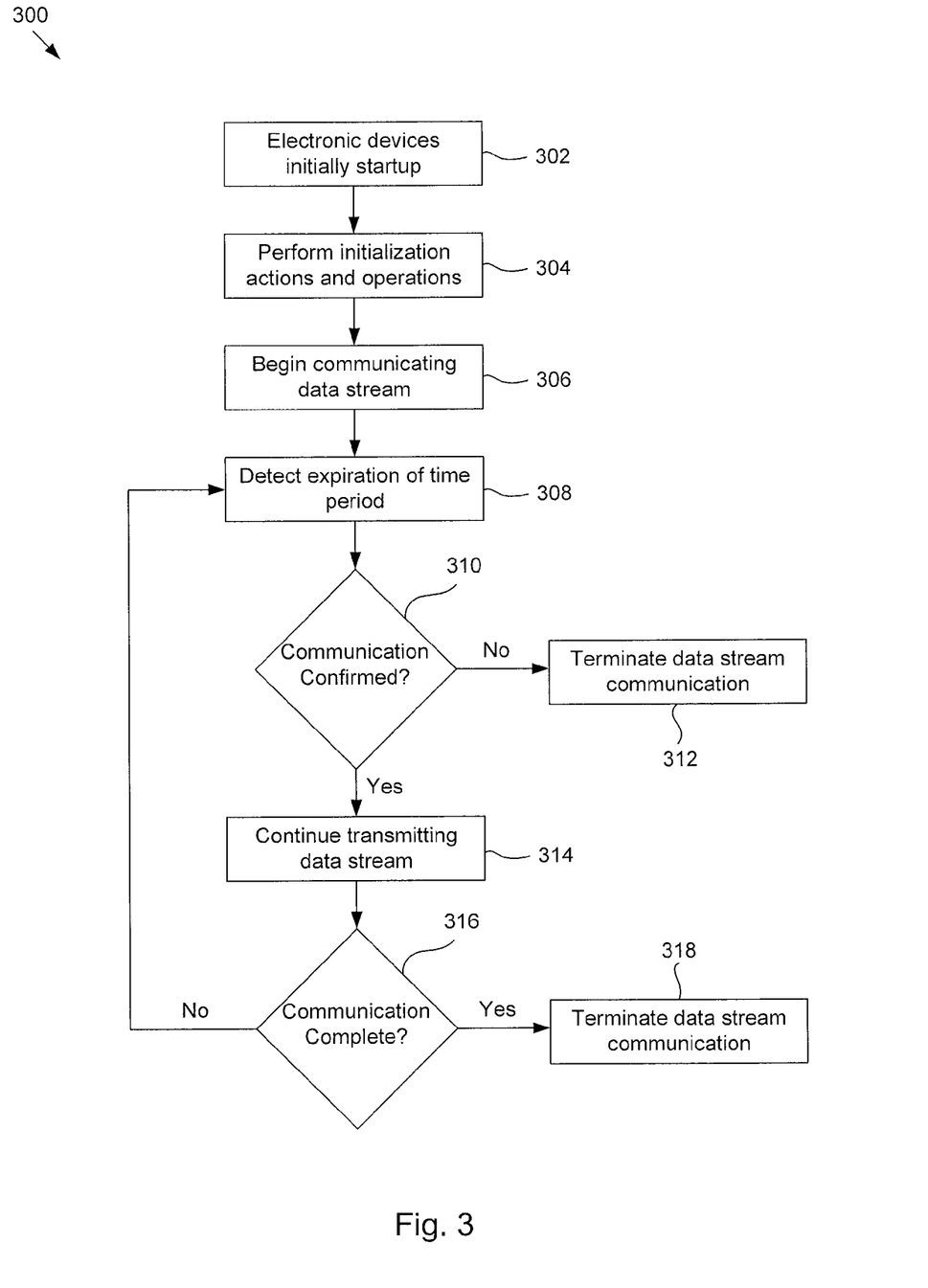
FIG. 3 is flow diagram of an example method of managing a data stream communication.

FIG. 3 shows a flow chart of an example method 300 of managing a communication of a data stream over a network in a network communication system. The network communication may include a plurality of electronic devices that communicate the data stream, which may include a talker, at least one listener, and at least one bridge. The system may optionally include other electronic devices, including other talkers, other listeners, and/or other bridges, that are not involved in the communication of the data stream and/or that communicate other data streams over the network. At block 302, the system, including the electronic devices, may initially startup, such as upon initially receiving power to activate processors or other electronic components in the system.

At block 304, the electronic devices may perform various initialization actions and operations to be configured to communicate the data stream and manage the communication using SRP. For example, the electronic devices may communicate auto-negotiation messages to attain link status. Additionally, the electronic devices may perform pre-reservation actions to be configured to communicate data streams over the network. Also, the electronic devices may perform SRP initialization in order to control and/or manage data stream communications using SRP. Some of the initialization actions and operations, or at least portions of the initialization actions and operations, may be performed concurrently following startup. In addition or alternatively, some of the initialization actions and operations, or at least portions of the initialization actions and operations, may be performed sequentially or at different times following startup. In addition or alternatively, the beginning times and/or the end times of the initialization actions and operations may occur at the same or substantially the same time, before, or after each other. In addition or alternatively, the times at which the initialization actions and operations may begin and/or end may be the same or different for the different electronic devices, and in some situations may depend on whether the electronic device is a talker, a listener, or a bridge. In general, an electronic device may begin SRP initialization following and/or in response to the electronic device attaining link status. Additionally, the electronic device may begin performing the pre-reservation actions at a time following or upon initial startup such that performance of the pre-reservation actions is complete before link status is attained or, if link status is attained first, as close to link status being attained as possible, so that the data stream may be communicated as far in advance as possible from when the data stream would otherwise be communicated if a reservation was first establishing using SRP before the data stream was communicated.

When both link status is attained and the electronic devices involved in the communication of the data stream complete performing the pre-reservation actions, the method may proceed to block 306, where the electronic devices may be configured in ready states and begin communicating the data stream over the network. In particular, the talker may begin transmitting the data stream, the one or more listeners may begin receiving the data stream, and the one or more bridges may receive and forward the data stream to a next location over the network. In the ready states at block 306, the electronic devices may communicate the data stream over the network without having established a reservation for the data stream, such as by establishing a reservation using SRP.

At block 308, one of the electronic devices in the system, which may or may not be involved in communication of the data stream, may detect an expiration of a time period set by a timer. The timer may have started during SRP initialization or in response to SRP initialization being completed. The time period may be a default time period set in accordance with SRP, although other time periods may be used. The electronic device may detect the expiration of the time period before communication of the data stream is complete. Also, at block 308, upon detection of the expiration of the time period, the talker and the one or more listeners communicating the data stream may transmit and register TA and LR messages to confirm the communication. For some example methods, the talker and the one more listeners may transmit the TA and LR messages in response to detecting or receiving a confirmation message, such as a LA message in accordance with SRP, as previously described. The LA message may be communicated over the network by the electronic device that detected expiration of the time period. Additionally, at block 308, the electronic devices in the system may reset and restart their timers upon detecting expiration of the time period.

At block 310, the talker and the one or more listeners may determine whether the data stream communication is confirmed. The talker and the one or more listeners may determine whether the data stream communication is confirmed by determining whether the TA and LR messages are successfully communicated and registered in accordance with SRP. For example, if the talker transmits and registers a TA message and also receives and registers one or more LR messages from the one or more listeners, then the talker may determine that the data stream is confirmed. Similarly, if each of the one or more listeners transmits and registers a LR message and also receives and registers a TA message from the talker, then the one or more listeners may determine that the data stream is confirmed. Alternatively, if the one or more listeners receives a TF message from the talker, and/or the talker receives a LRF or a LAF message from the one or more listeners, then the talker and the one or more listeners may determine that the data stream communication is not confirmed.

If the talker and the one or more listeners determine that the data stream communication is not confirmed, then at block 312, the talker and the one or more listeners may terminate the data stream communication. In particular, the talker may stop transmission of the data stream. Additionally, the talker and the one or more listeners may remove any reservations established through TA and LR messages previously communicated in response to a LA message to confirm the data stream communication. For example, the talker and the one or more listeners may communicate TAL and LRL messages over the network to de-register any TA and LR messages and associated talker and listener attributes that may have been registered in response to detection of a LA message to confirm the communication. Alternatively, if the talker and the one or more listeners determine that the data stream communication is confirmed, then at block 314, the talker may continue transmitting the data stream over the network to the one or more listeners.

At block 316, if the communication of the data stream is complete, then at block 318 the talker may stop transmitting the data stream. Additionally, the talker and the one or more listeners may remove any reservations established through TA and LR messages previously communicated to confirm the data stream communication and may de-register any TA and LR messages and associated attributes, as previously described for block 312. Alternatively, if the data stream communicate is not complete, then the method 300 may proceed back to block 308, where an electronic device in the system detects an expiration of a timer.

While various embodiments of the description have been described, it will be apparent to those of ordinary skill in the art that many more embodiments and implementations are possible within the scope of the description. Accordingly, the description is not to be restricted except in light of the attached claims and their equivalents.

I claim:

1. An electronic device configured as a talker in a network communication system, the electronic device comprising:
   a processor and a memory storing instructions which, when executed by the processor, are configured to:
   prior to communication of a data stream over a network and prior to initialization of a reservation for a data stream communication, determine pre-reservation information, the pre-reservation information comprising a stream identifier and bandwidth allocation for the data stream;
   begin communication of the data stream over the network without establishment of the reservation for the data stream communication; and
   after the data stream communication begins, confirm the data stream communication using a reservation protocol.

2. The electronic device of claim 1, where the pre-reservation information further comprises at least one destination address for at least one listener to receive the data stream, and where the processor is further configured to:
attain a link status,
where the processor is configured to communicate the data stream without establishment of the reservation in response to determination of the pre-reservation information and attainment of the link status.

3. The electronic device of claim 2, where the pre-reservation information is retrieved from local memory of the electronic device without performing a reservation initialization or transmitting a message to establish a reservation, where the processor is configured to communicate at least one auto-negotiation message with a peer node of the electronic device to attain the link status, and where the processor is configured to communicate the at least one auto-negotiation message with the peer node concurrently with determination of the pre-reservation information.

4. The electronic device of claim 1, where the processor is further configured to:
perform an initialization of the reservation protocol,
where the processor is configured to confirm the data stream communication using the reservation protocol after performance of the initialization of the reservation protocol.

5. The electronic device of claim 4, where the processor is configured to confirm the data stream communication using the reservation protocol in response to expiration of a time period set in response to the initialization of the reservation protocol.

6. The electronic device of claim 5, where the processor is configured to establish a reservation for the data stream communication when using the reservation protocol to confirm the data stream communication in response to expiration of the time period.

7. The electronic device of claim 6, where the processor is configured to remove the reservation using the reservation protocol when communication of the data stream is complete.

8. The electronic device of claim 5, where the processor is further configured to maintain the data stream communication in response to confirmation of the data stream communication, and where the processor is further configured to:
determine that the data stream communication is not confirmed; and
terminate the data stream communication in response to the data stream communication not being confirmed.

9. A method of managing a data stream communication, the method comprising:
configuring, with a processor, a talker in a ready state to transmit a data stream over a network to one or more listeners without establishing a reservation for the data stream by determining pre-reservation information prior to communication of the data stream over the network and prior to initialization of the reservation for a data stream communication, the pre-reservation information including a stream identifier and bandwidth allocation for the data stream;
transmitting, with the processor, the data stream over the network without establishing the reservation;
initializing, with the processor, the talker with a reservation protocol; and
confirming, with the processor, the data stream communication using the reservation protocol.

10. The method of claim 9, where configuring the talker in the ready state comprises:

attaining, with the processor, a link status for the talker, and where the pre-reservation information further comprises one or more destination addresses of the one or more listeners.

11. The method of claim 10, wherein the pre-reservation information is determined by accessing a local memory of the talker, the method further comprising:
communicating, with the processor, auto-negotiation messages to attain the link status for the talker, the auto-negotiation messages being communicated concurrently with determining the pre-reservation information.

12. The method of claim 9, further comprising:
detecting, with the processor, expiration of a predetermined time period set by a timer,
where confirming the data stream communication using the reservation protocol comprises confirming the data stream communication in response to expiration of the predetermined time period.

13. The method of claim 12, further comprising:
receiving, with the processor, a confirmation message communicated over the network in response to expiration of the predetermined time period; and
communicating, with the processor, a stream advertisement message using the reservation protocol in response to receiving the confirmation message to confirm the data stream communication.

14. The method of claim 9, where configuring the talker in the ready state comprises:
configuring, with the processor, the talker in the ready state upon startup of the talker, wherein the pre-reservation information is determined responsive to the startup of the talker.

15. One or more non-transitory computer readable storage media encoded with software comprising computer executable instructions, the computer executable instructions comprising:
instructions to configure a talker in a ready state to communicate a data stream over a network without establishment of a reservation for a data stream communication, the instructions to configure the talker to communicate the data stream comprising instructions to determine pre-reservation information prior to communication of the data stream over the network and prior to initialization of the reservation for the data stream communication, the pre-reservation information including a stream identifier and bandwidth allocation for the data stream;
instructions to initialize the talker with a reservation protocol; and
instructions to confirm the data stream communication with the reservation protocol after the talker begins the data stream communication.

16. The one or more non-transitory computer readable storage media of claim 15, where the pre-reservation information further comprises at least one destination address of at least one listener to receive the data stream, and where the instructions to configure the talker in the ready state comprise:
instructions for the talker to communicate auto-negotiation messages to a peer node to attain a link status.

17. The one or more non-transitory computer readable storage media of claim 15, further comprising:
where the instructions to confirm the data stream communication with the reservation protocol comprise instructions to confirm the data stream communication in response to expiration of a predetermined time period set by a timer in accordance with the reservation protocol.

18. The one or more non-transitory computer readable storage media of claim 15, further comprising:
   instructions for the talker to communicate a stream advertisement message using the reservation protocol to confirm the data stream communication.

19. The one or more non-transitory computer readable storage media of claim 15, where the instructions to configure the talker in the ready state comprise instructions to configure the talker in the ready state in response to a startup of the talker.

20. The one or more non-transitory computer readable storage media of claim 15, further comprising instructions to configure a bridge in a ready state to receive the data stream and forward the data stream to a next location over the network without establishment of the reservation for the data stream communication.

21. A network communication system comprising:
   a bridge configured to communicate a data stream over a network between a talker and a listener, the bridge comprising a processor and a memory storing instructions which, when executed by the processor, are configured to:

determine pre-reservation information prior to communication of the data stream over the network and prior to initialization of a reservation for a data stream communication and configure the bridge in a ready state to communicate the data stream over the network without receipt of at least one reservation message communicated to the bridge to establish the reservation for the data stream communication in accordance with a reservation protocol, where the pre-reservation information comprises mapping information and traffic shaping information;

in the ready state, receive the data stream and forward the data stream to a next location over the network;

after receipt and forwarding of at least a portion of the data stream:

receive at least one reservation message communicated from at least one of the talker or the listener to confirm the data stream communication in accordance with the reservation protocol;

forward the at least one reservation message over the network to confirm the data stream communication.

* * * * *